(12) United States Patent
Lee et al.

(10) Patent No.: US 8,879,141 B2
(45) Date of Patent: *Nov. 4, 2014

(54) ANALOG INTERFEROMETRIC MODULATOR

(71) Applicant: QUALCOMM MEMS Technologies, Inc., San Diego, CA (US)

(72) Inventors: Chong U. Lee, San Diego, CA (US);
John H. Hong, San Clemente, CA (US);
Marc M. Mignard, San Jose, CA (US);
Alok Govil, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,664

(22) Filed: Nov. 14, 2013

(65) Prior Publication Data

US 2014/0071516 A1 Mar. 13, 2014

Related U.S. Application Data

(63) Continuation of application No. 13/169,947, filed on Jun. 27, 2011, now Pat. No. 8,619,350, which is a continuation of application No. 12/485,003, filed on Jun. 15, 2009, now Pat. No. 7,990,604.

(51) Int. Cl.
| | | |
|---|---|---|
| *G02B 26/00* | (2006.01) | |
| *G02F 1/03* | (2006.01) | |
| *G02F 1/29* | (2006.01) | |
| *G09G 3/34* | (2006.01) | |

(52) U.S. Cl.
CPC ............ *G02B 26/001* (2013.01); *G09G 3/3466* (2013.01); *G09G 2320/0693* (2013.01)
USPC ........... 359/295; 359/245; 359/298; 359/315; 359/320; 345/108; 345/212; 324/511

(58) Field of Classification Search
CPC ............... G02B 26/00; G02B 26/0816; G02B 26/0841; G02B 26/001; G02B 26/02; G02B 26/023; G02B 26/0833; G02F 1/29; G02F 1/3136; G02F 1/00; G02F 1/31
USPC ......... 359/245, 290–295, 298, 279, 315, 316, 359/320; 345/108, 204, 212; 324/458, 511, 324/678, 688; 438/52; 250/336.1
See application file for complete search history.

(56) References Cited

U.S. PATENT DOCUMENTS 4,318,002 A * 3/1982 Pressman et al. .......... 250/492.2
4,403,248 A 9/1983 Te Velde (Continued)

FOREIGN PATENT DOCUMENTS

EP 1017038 A2 7/2000
EP 1473691 A2 11/2004

(Continued)

OTHER PUBLICATIONS

ISR and WO dated Sep. 24, 2010 in PCT/US10/037658.

(Continued)

*Primary Examiner* — Loha Ben
(74) *Attorney, Agent, or Firm* — Knobbe, Martens, Olson & Bear, LLP

(57) ABSTRACT

Methods and devices for calibrating and controlling the actuation of an analog interferometric modulator configured to have a plurality of actuation states. Devices and methods for calibrating an analog interferometric modulator to respond in linear relation to an applied voltage.

21 Claims, 12 Drawing Sheets

(56) References Cited

U.S. PATENT DOCUMENTS

| | | | | |
|---|---|---|---|---|
| 4,954,789 | A | 9/1990 | Sampsell | |
| 5,550,373 | A | 8/1996 | Cole et al. | |
| 5,784,189 | A | 7/1998 | Bozler et al. | |
| 5,808,780 | A | 9/1998 | McDonald | |
| 5,822,110 | A * | 10/1998 | Dabbaj | 359/293 |
| 5,838,484 | A | 11/1998 | Goossen | |
| 6,040,937 | A | 3/2000 | Miles | |
| 6,097,044 | A | 8/2000 | Nakashiba | |
| 6,297,777 | B1 | 10/2001 | Tsubaki et al. | |
| 6,384,953 | B1 | 5/2002 | Russell et al. | |
| 6,466,354 | B1 | 10/2002 | Gudeman | |
| 6,528,958 | B2 | 3/2003 | Hulshof et al. | |
| 6,574,033 | B1 | 6/2003 | Chui et al. | |
| 6,635,919 | B1 | 10/2003 | Melendez et al. | |
| 6,666,561 | B1 | 12/2003 | Blakley | |
| 6,674,562 | B1 | 1/2004 | Miles | |
| 6,680,792 | B2 | 1/2004 | Miles | |
| 6,791,735 | B2 * | 9/2004 | Stappaerts | 359/245 |
| 6,829,132 | B2 | 12/2004 | Martin et al. | |
| 6,843,576 | B2 | 1/2005 | Blakley | |
| 7,042,643 | B2 | 5/2006 | Miles | |
| 7,046,422 | B2 | 5/2006 | Kimura et al. | |
| 7,072,093 | B2 | 7/2006 | Piehl et al. | |
| 7,123,216 | B1 | 10/2006 | Miles | |
| 7,126,741 | B2 | 10/2006 | Wagner et al. | |
| 7,161,728 | B2 | 1/2007 | Sampsell et al. | |
| 7,199,916 | B2 | 4/2007 | Faase et al. | |
| 7,245,285 | B2 | 7/2007 | Yeh et al. | |
| 7,262,609 | B2 * | 8/2007 | Reynolds | 324/678 |
| 7,265,554 | B2 | 9/2007 | Ichimura et al. | |
| 7,274,347 | B2 | 9/2007 | Richards | |
| 7,280,078 | B2 | 10/2007 | Salsman et al. | |
| 7,327,510 | B2 | 2/2008 | Cummings et al. | |
| 7,355,779 | B2 | 4/2008 | Mignard et al. | |
| 7,379,227 | B2 | 5/2008 | Miles | |
| 7,382,512 | B2 * | 6/2008 | Chen et al. | 359/279 |
| 7,400,489 | B2 | 7/2008 | Van Brocklin et al. | |
| 7,411,792 | B2 | 8/2008 | Richards et al. | |
| 7,417,441 | B2 * | 8/2008 | Reynolds | 324/678 |
| 7,420,135 | B2 | 9/2008 | Lee et al. | |
| 7,447,891 | B2 | 11/2008 | Faase et al. | |
| 7,486,429 | B2 * | 2/2009 | Chui | 359/290 |
| 7,511,875 | B2 | 3/2009 | Miles | |
| 7,521,942 | B2 * | 4/2009 | Reynolds | 324/688 |
| 7,554,331 | B2 | 6/2009 | Ichimura et al. | |
| 7,560,299 | B2 | 7/2009 | Cummings | |
| 7,576,546 | B2 | 8/2009 | Ichimura et al. | |
| 7,619,805 | B2 | 11/2009 | Faase et al. | |
| 7,646,529 | B2 * | 1/2010 | Chui | 359/295 |
| 7,649,671 | B2 | 1/2010 | Kothari et al. | |
| 7,671,397 | B2 | 3/2010 | Fujita et al. | |
| 7,715,079 | B2 | 5/2010 | Kogut et al. | |
| 7,733,553 | B2 * | 6/2010 | Faase et al. | 359/245 |
| 7,791,787 | B2 | 9/2010 | Miles | |
| 7,800,809 | B2 | 9/2010 | Miles | |
| 7,807,305 | B2 | 10/2010 | Leonida | |
| 7,839,556 | B2 | 11/2010 | Miles | |
| 7,889,163 | B2 | 2/2011 | Chui et al. | |
| 7,978,395 | B2 | 7/2011 | Felnhofer et al. | |
| 7,990,604 | B2 * | 8/2011 | Lee et al. | 359/295 |
| 8,102,592 | B2 * | 1/2012 | Ji | 359/295 |
| 8,144,385 | B2 * | 3/2012 | Chui | 359/295 |
| 8,619,350 | B2 * | 12/2013 | Lee et al. | 359/245 |
| 2001/0026250 | A1 | 10/2001 | Inoue et al. | |
| 2002/0051281 | A1 | 5/2002 | Ueda et al. | |
| 2004/0008396 | A1 | 1/2004 | Stappaerts | |
| 2004/0212026 | A1 | 10/2004 | Van Brocklin et al. | |
| 2004/0217378 | A1 | 11/2004 | Martin et al. | |
| 2004/0240138 | A1 | 12/2004 | Martin et al. | |
| 2005/0001828 | A1 | 1/2005 | Martin et al. | |
| 2007/0024550 | A1 | 2/2007 | Chui et al. | |
| 2007/0046950 | A1 | 3/2007 | Brown et al. | |
| 2007/0058095 | A1 | 3/2007 | Miles | |
| 2007/0075942 | A1 | 4/2007 | Martin et al. | |
| 2007/0086078 | A1 | 4/2007 | Hagood et al. | |
| 2010/0245313 | A1 | 9/2010 | Lewis et al. | |
| 2012/0044237 | A1 | 2/2012 | Hong et al. | |
| 2012/0044562 | A1 | 2/2012 | Hong et al. | |

FOREIGN PATENT DOCUMENTS

| | | |
|---|---|---|
| JP | 2004334201 A | 11/2004 |
| JP | 2008306460 A | 12/2008 |
| WO | WO-02086582 A1 | 10/2002 |

OTHER PUBLICATIONS

Miles M.W. et al., 5.3 Digital Paper™ Reflective Displays using Interferometric Modulation, SID Digest, vol. XXXI, 2000, pp. 32-35.

Miles M.W., "MEMS-Based Interferometric Modulator for Display Applications," Proceedings of SPIE Conference on Micromachined Devices and Components V, Sep. 1999, SPIE vol. 3876, pp. 20-28.

Seeger, et al., "Stabilization of Electrostatically Actuated Mechanical Devices," International Conference on Solid State Sensors and Actuators, 1997, vol. 2, 1133-1136.

* cited by examiner

|  | Column Output Signals | |
|---|---|---|
|  | + $V_{bias}$ | - $V_{bias}$ |
| Row Output Signals   0 | Stable | Stable |
| + ΔV | Relax | Actuate |
| − ΔV | Actuate | Relax |

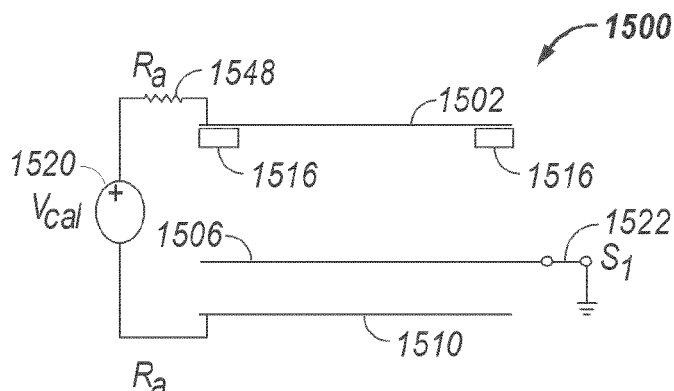
FIG. 14A
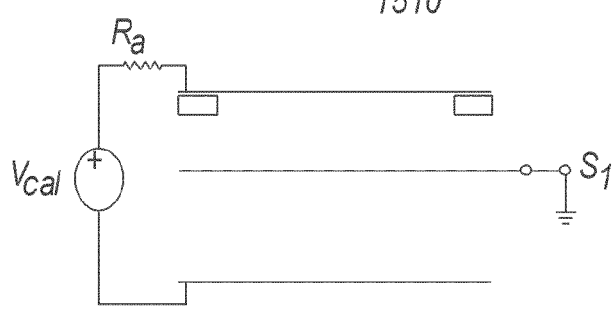
FIG. 14B
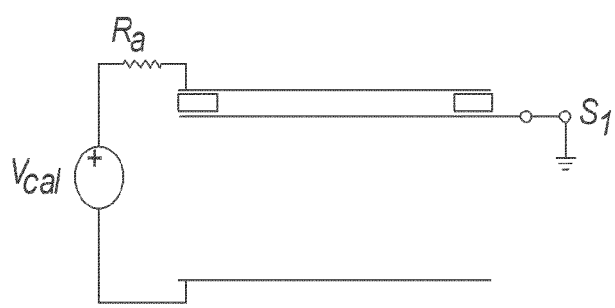
FIG. 14C
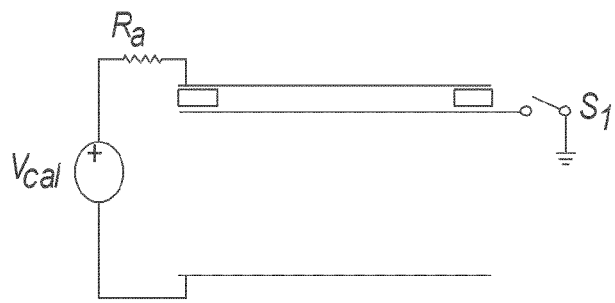
FIG. 14D
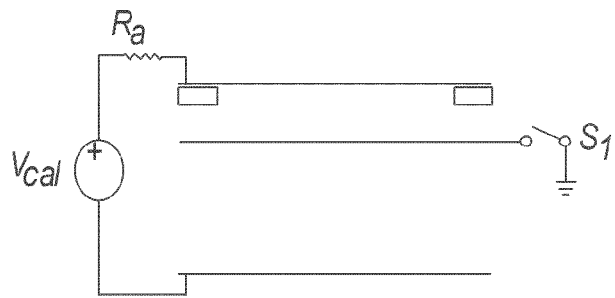
FIG. 14E
FIG. 14

ANALOG INTERFEROMETRIC MODULATOR

CROSS-REFERENCE TO RELATED APPLICATIONS

This disclosure claims priority to and is a continuation of U.S. patent application Ser. No. 13/169,947, filed Jun. 27, 2011 and now issued as U.S. Pat. No. 8,619,350, entitled "ANALOG INTERFEROMETRIC MODULATOR" and assigned to the assignee hereof, which is a continuation of U.S. patent application Ser. No. 12/485,003, filed Jun. 15, 2009 and now issued as U.S. Pat. No. 7,990,604, entitled "ANALOG INTERFEROMETRIC MODULATOR" and assigned to the assignee hereof. The disclosure of the prior applications is considered part of, and is incorporated by reference in, this disclosure.

BACKGROUND

1. Field of the Invention

The present invention relates to driving schemes and calibration methods for analog interferometric modulators.

2. Description of Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that absorbs and/or reflects light in a spectrally selective manner using the principles of optical interference. In certain embodiments, an interferometric modulator may comprise a pair of electrically conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

BRIEF DESCRIPTION OF THE DRAWINGS

FIGS. 14A-14E illustrate an interferometric modulator of the embodiment of FIG. 9 in various stages of an embodiment of a calibration process.

DETAILED DESCRIPTION

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Methods and devices are described herein related to analog interferometric modulators. An analog interferometric modulator may be driven to several different states each with different optical properties. Specifically methods and devices for calibrating and controlling the actuation of an analog interferometric modulator to achieve the various states are described.

Figure 1:
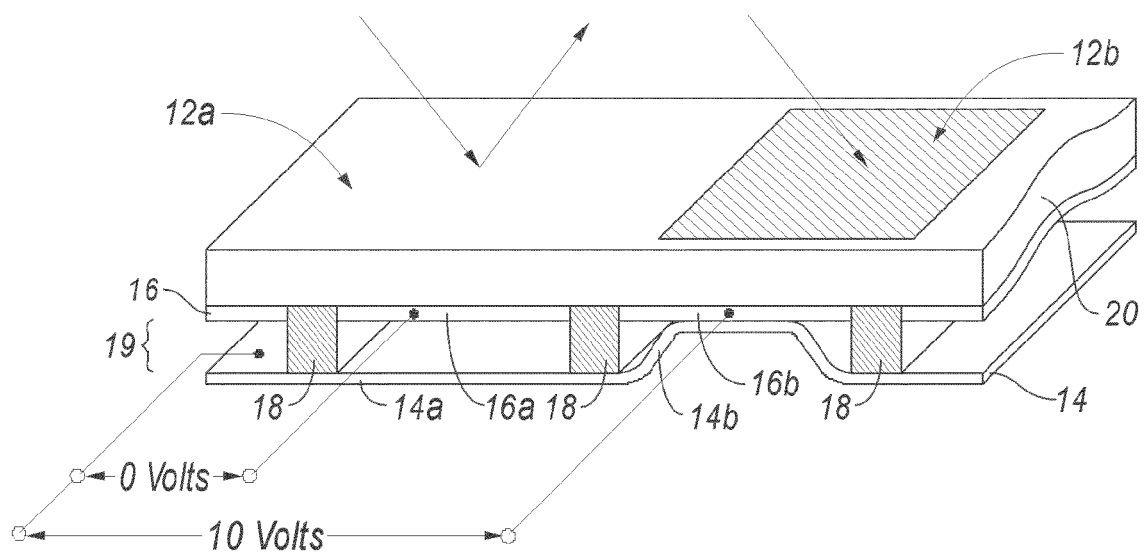
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, each pixel is in either a bright or dark state. In the bright ("relaxed" or "open") state, the display element reflects a large portion of the incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a highly reflective layer positioned at a variable and controllable distance from another layer which absorbs optical energy more or less uniformly across the visible spectrum, forming a controllable optical gap. In one embodiment, the reflective layer may be moved between two positions. In the first position, referred to herein as the relaxed position, the movable reflective layer is positioned at a relatively large distance from the absorbing layer. In the second position, referred to herein as the actuated position, the movable reflective layer is positioned more closely adjacent to the absorbing layer. Incident light that reflects from the reflective layer interferes constructively or destructively within the gap between the reflective and absorbing layers, which determines whether the reflection from the pixel is in a highly reflecting or a highly absorbing state.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several stratified layers, which can include an electrode layer, such as indium tin oxide (ITO), an absorbing layer, such as chromium, and a transparent dielectric. The optical stack 16 is thus electrically conductive, partially transparent and partially reflective, and may be fabricated, for example, by depositing one or more of the above layers onto a transparent substrate 20. The absorbing layer can be formed from a variety of materials that are partially reflective such as various metals, semiconductors, and dielectrics. The absorbing layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be in the range 0-6000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
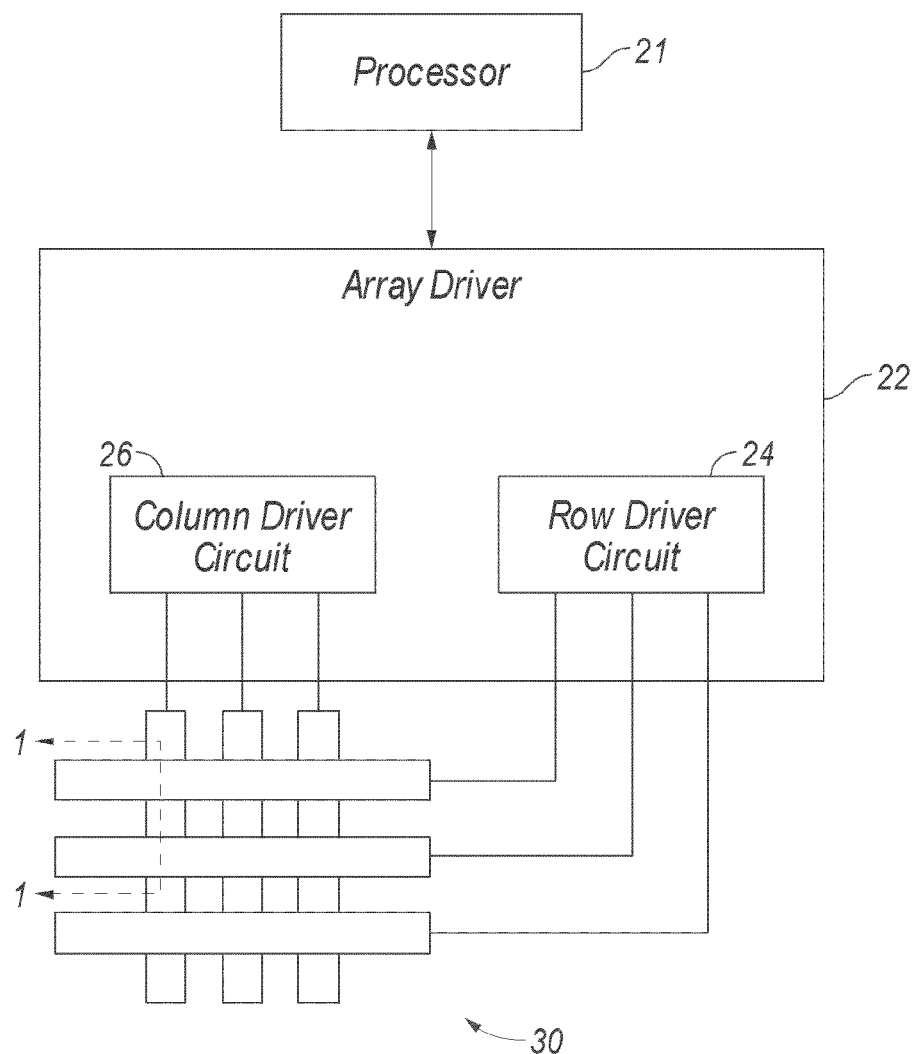
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
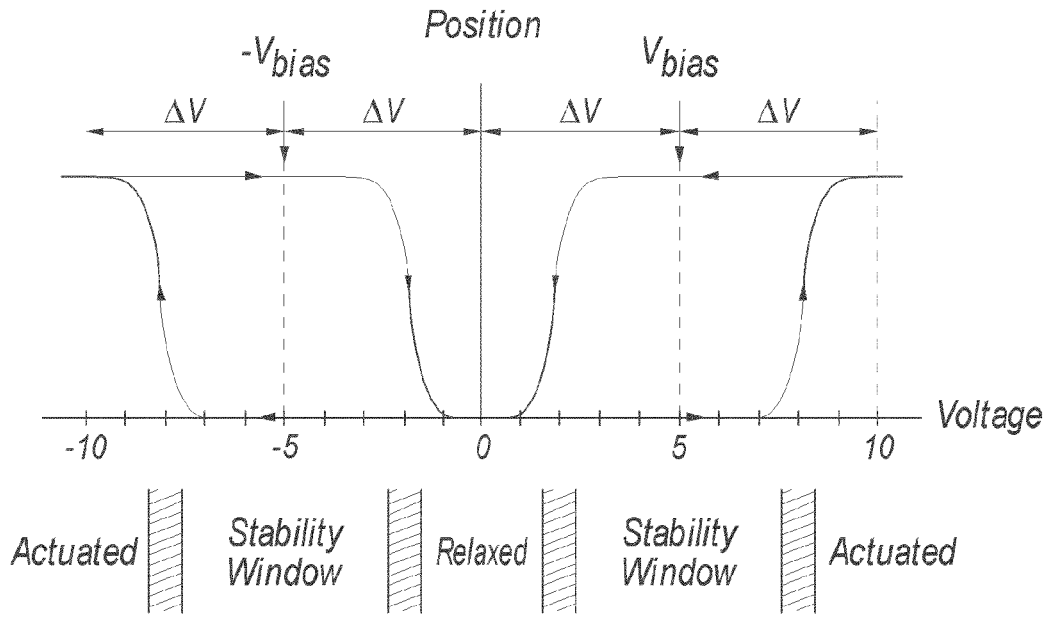
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
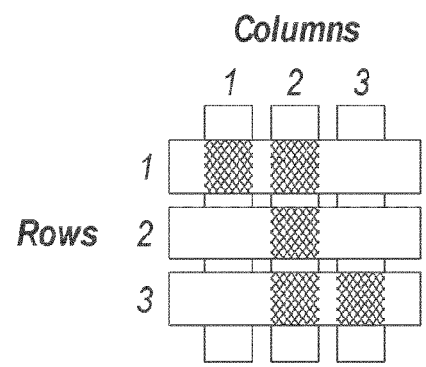
FIGS. 5A and 5B illustrate one exemplary timing diagram for row and column signals that may be used to write a frame of display data to the 3×3 interferometric modulator display of FIG. 2.
Figure 5B:
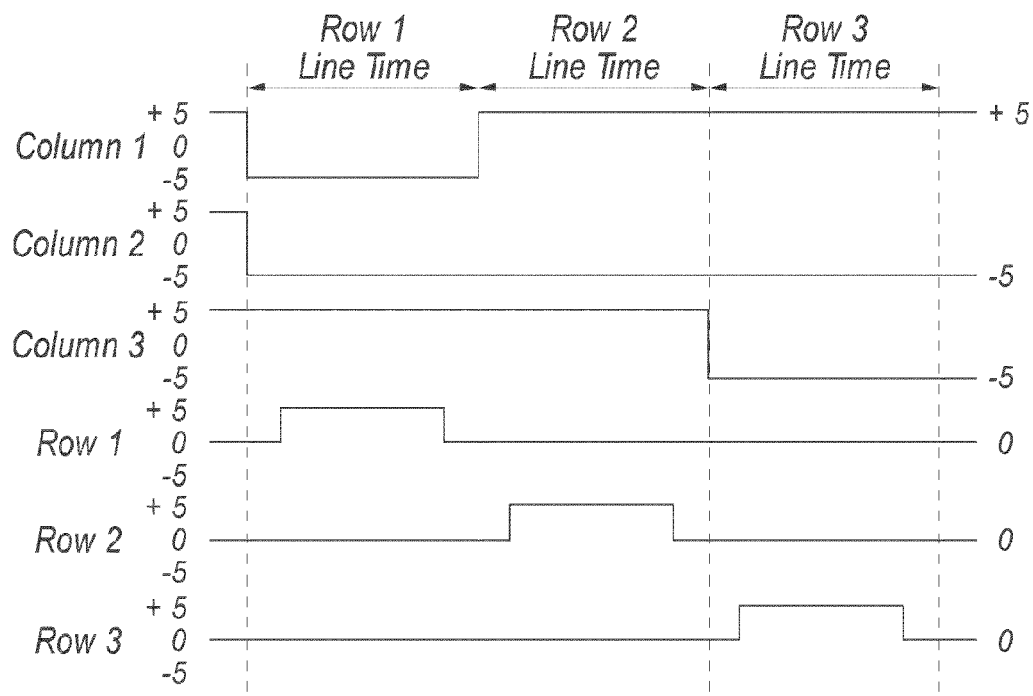

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
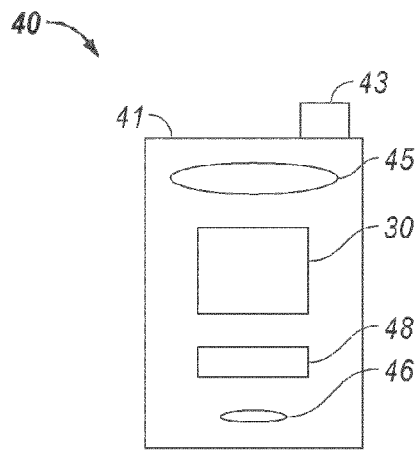
FIGS. 6A and 6B are system block diagrams illustrating an embodiment of a visual display device comprising a plurality of interferometric modulators.
Figure 6B:
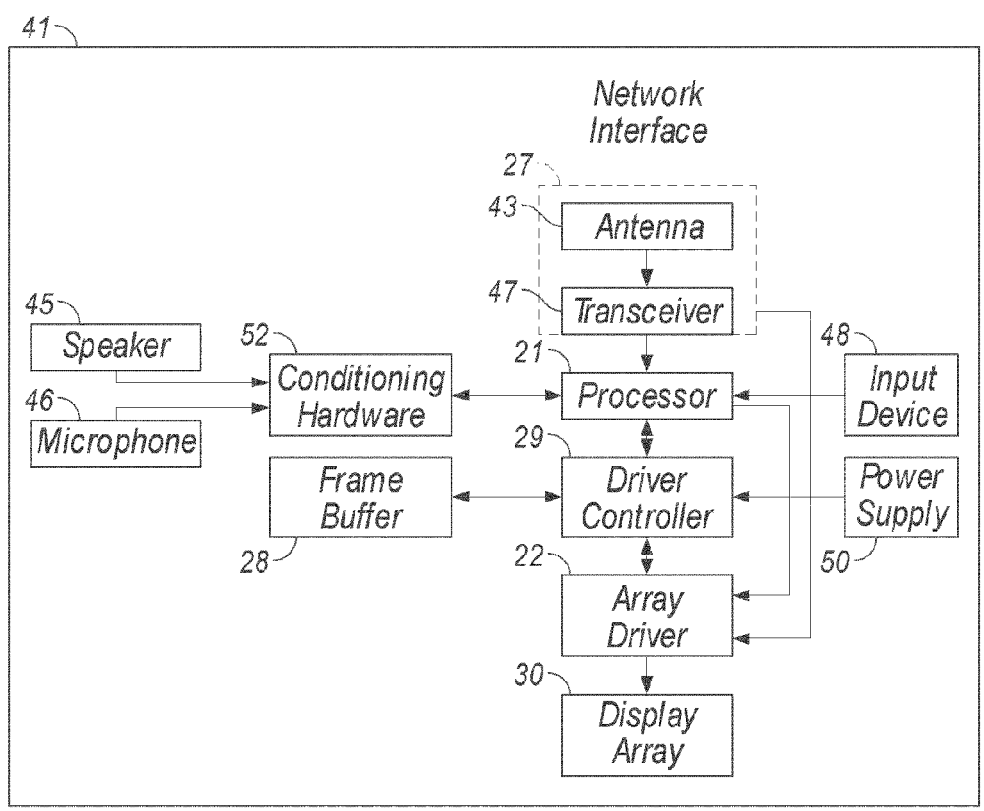

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
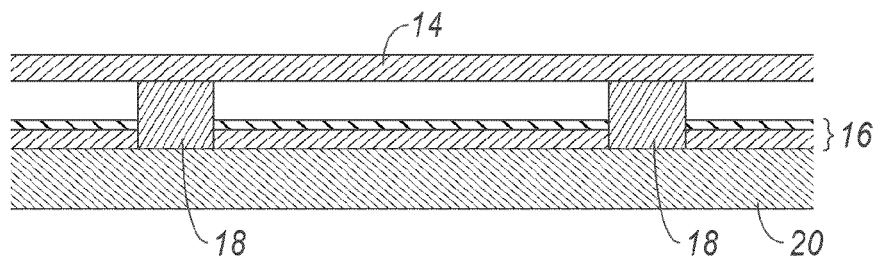
FIG. 7A is a cross section of the device of FIG. 1.
Figure 7B:
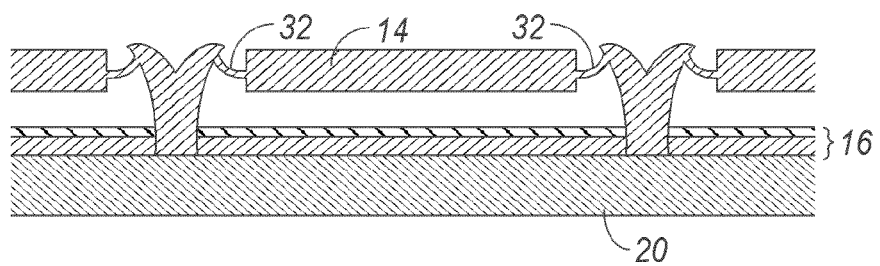
FIG. 7B is a cross section of an alternative embodiment of an interferometric modulator.
Figure 7C:
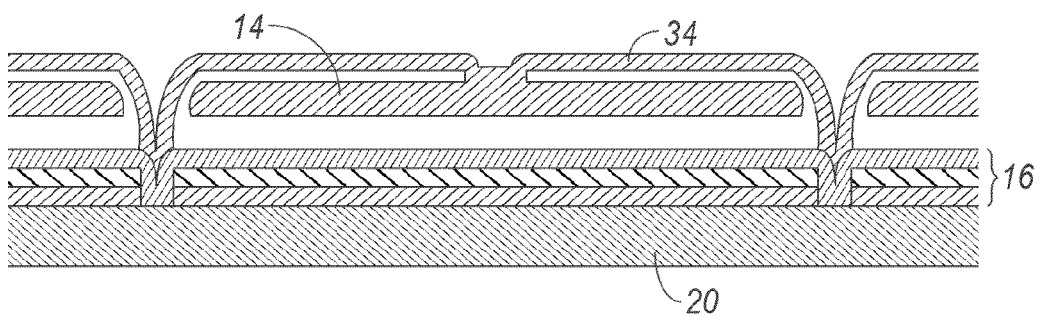
FIG. 7C is a cross section of another alternative embodiment of an interferometric modulator.
Figure 7D:
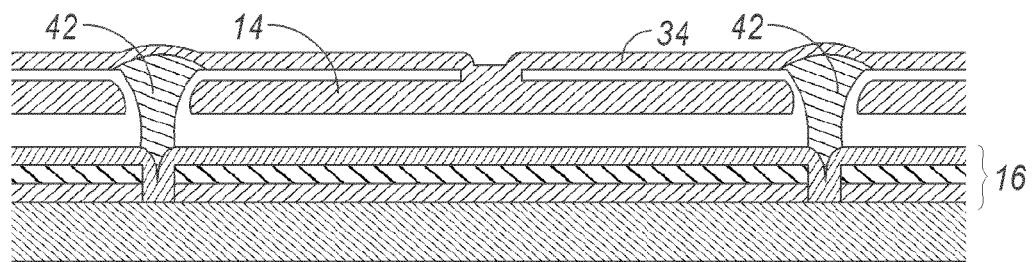
FIG. 7D is a cross section of yet another alternative embodiment of an interferometric modulator.
Figure 7E:
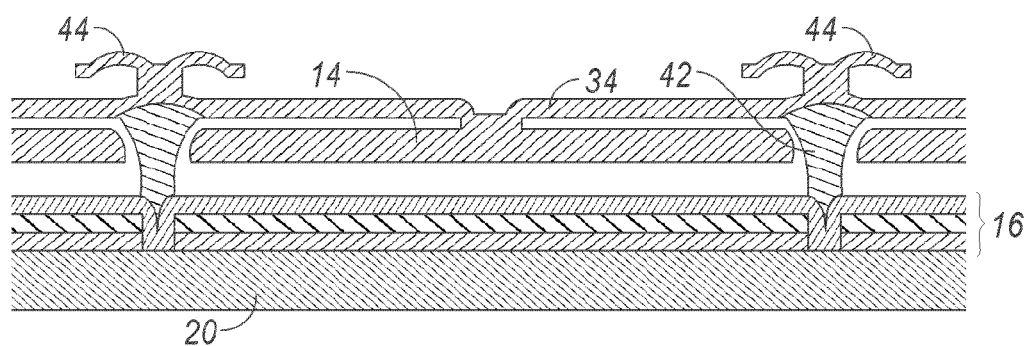
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

The interferometric modulators described above are bi-stable display elements having a relaxed state and an actuated state. The following description, however, relates to analog interferometric modulators. These analog interferometric modulators have a range of states. For example, in one embodiment of an analog interferometric modulator, a single interferometric modulator can have a red state, a green state, a blue state, a black state, and a white state. Accordingly, a single interferometric modulator is configured to have various states with different light reflectance properties over a wide range of the optical spectrum. Further, the optical stack of the analog interferometric modulator may differ from the bi-stable display elements described above. These differences may produce different optical results. For example, in the bi-stable elements described above, the closed state gives the bi-stable element a black reflective state. The analog interferometric modulator, however, has a white reflective state when the electrodes are in a similar position to the closed state of the bi-stable element.

Figure 8:
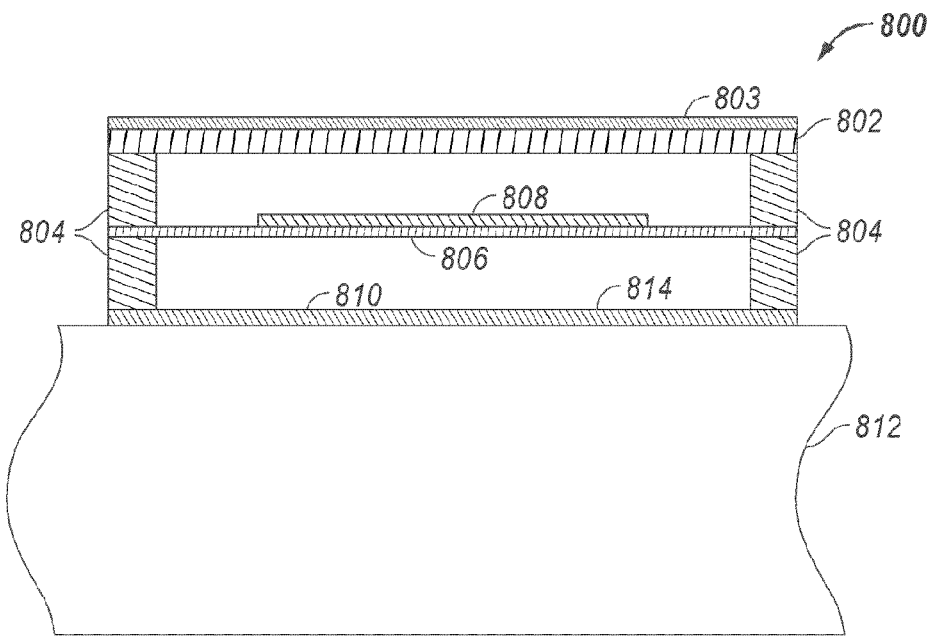
FIG. 8 is a cross-section of an embodiment of an interferometric modulator with three layers in which a movable middle layer is in a relaxed position.

FIG. 8 is an exemplary embodiment of an analog interferometric modulator 800 having a three layer or electrode design. The modulator 800 includes an upper electrode 802. In one embodiment electrode 802 is a plate made of metal. The upper electrode 802 may be stiffened using a stiffening layer 803. In one embodiment, the stiffening layer 803 is a dielectric. The stiffening layer 803 may be used to keep the upper electrode 802 rigid and substantially flat. The modulator 800 also includes a middle electrode 806 and a lower electrode 810. The three electrodes are electrically insulated by insulating posts 804. The insulating posts 804 also serve to hold middle electrode 806 between electrodes 802 and 810 in a steady state when no electrostatic forces are present. The middle electrode 806 has a stiffening layer 808 disposed thereon. In one embodiment the stiffening layer 808 is made of silicon oxynitride. The middle electrode 806 is configured to move in the area between upper electrode 802 and lower electrode 810. The stiffening layer 808 keeps a portion of the middle electrode 806 rigid and substantially flat as it moves between electrodes 802 and 810. In one embodiment, the stiffening layer 808 is disposed on the central portion of the middle electrode 806. In this embodiment, the side portions of the middle electrode 806 are able to bend as the middle electrode 806 moves. In FIG. 8, middle electrode 806 is shown in an equilibrium position where the entire electrode is substantially flat. As the middle electrode 806 moves away from this equilibrium position, the side portions of the middle electrode 806 will deform or bend. The side portions of the middle electrode 806 implement an elastic spring force that applies a force to move the middle electrode 806 back to the equilibrium position. The middle electrode 806 also serves as a metal mirror to reflect light entering the structure through substrate 812. In an exemplary embodiment, substrate 812 is made of glass. In one embodiment, the lower electrode 810 is an absorbing chromium layer. The lower electrode 810 has a passivation layer 814 disposed thereon. In one embodiment, the passivation layer 814 is a thin dielectric layer. In an exemplary embodiment, the upper electrode 802 has a passivation layer disposed thereon. In one embodiment, the passivation layer is a thin dielectric layer.

Figure 9:
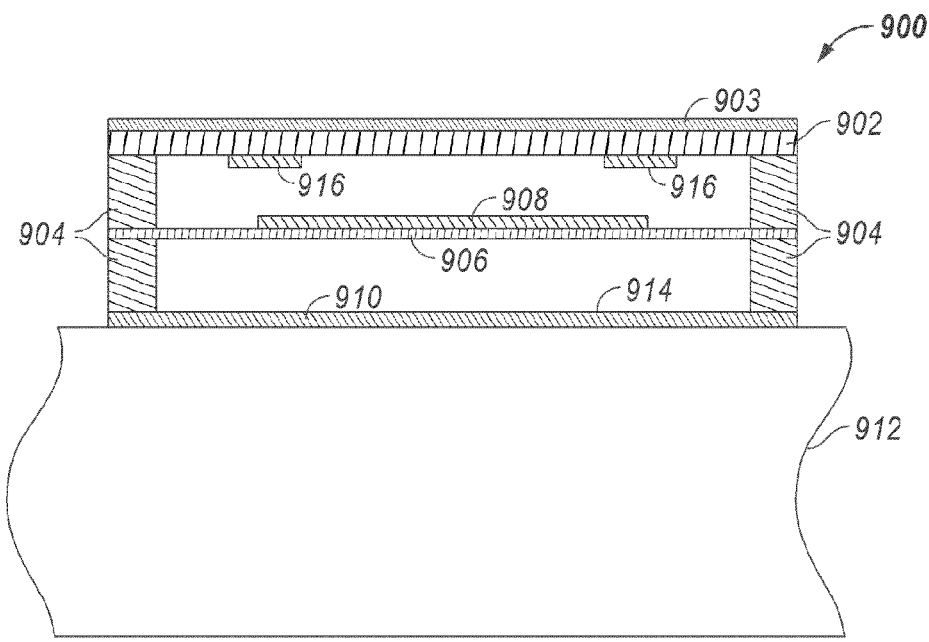
FIG. 9 is a cross-section of an interferometric modulator of the embodiment of FIG. 8 with resistive elements disposed on the first layer.

FIG. 9 is another exemplary embodiment of an analog interferometric modulator 900 which is similar to modulator 800 of FIG. 8. The modulator 900, however, has a larger stiffening layer 908 disposed on the middle electrode 906 and further includes resistive elements 916 disposed on the upper electrode 902. The upper electrode 902 has a stiffening layer 903 disposed thereon. In one exemplary embodiment, the upper electrode 902 is a metal and the stiffening layer 903 is a dielectric. The modulator 900 also includes a lower electrode 910 with a thin dielectric passivation layer 914 disposed thereon. The lower electrode 910 is disposed on a substrate 912. Resistive elements 916 provide a separator between upper electrode 902 and middle electrode 906. When middle electrode 906 is moved toward upper electrode 902, resistive elements 916 prevent the middle electrode 906 from coming into contact with the upper electrode 902. In one embodiment, middle electrode 906 includes an insulating layer disposed on the bottom portion of the middle electrode 906.

Figure 10:
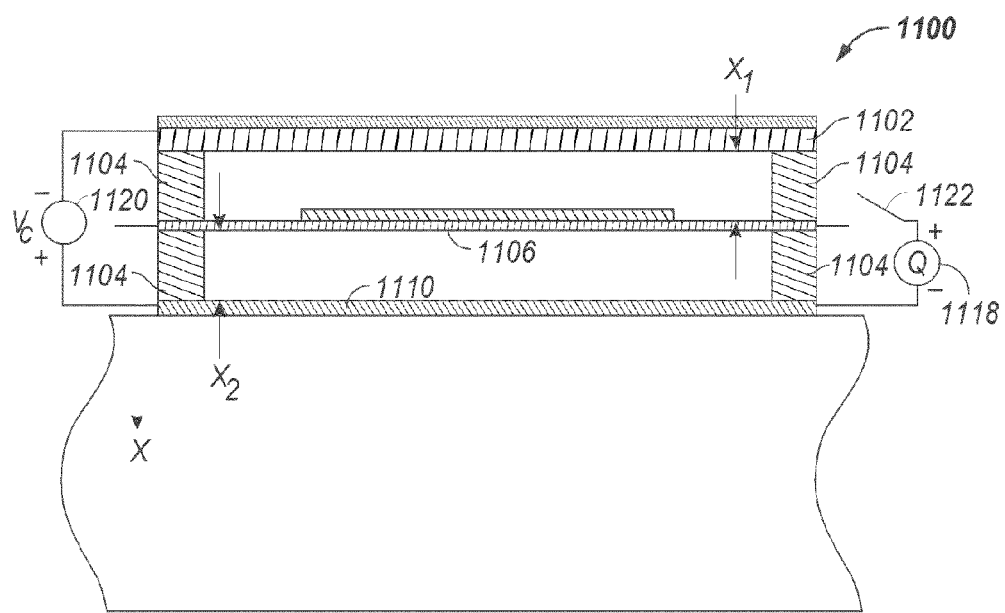
FIG. 10 is a cross-section of an interferometric modulator of the embodiment of FIG. 8 with a control circuit.

FIG. 10 is an exemplary embodiment of an analog interferometric modulator 1100 with a control circuit 1120. The analog interferometric modulator 1100 may be any one of modulator 800, modulator 900, modulator 1000, or other similar design of analog interferometric modulator. Modulator 1100 includes an upper electrode 1102, a middle electrode 1106, and a lower electrode 1110. The modulator 1100 further includes insulating posts 1104 that insulate electrodes 1102, 1106, and 1110 from other structures.

The control circuit 1120 is configured to apply a voltage across the upper electrode 1102 and the lower electrode 1110. A charge pump 1118 is configured to selectively apply a charge to the middle electrode 1106. Using the control voltage 1120 and the charge pump 1118, electrostatic actuation of the middle electrode 1106 is achieved. The charge pump 1118 is used to charge the middle electrode 1106 with a dose of electric charge. The charged middle electrode 1106 then interacts with the electric field created by control circuit 1120 between upper electrode 1102 and the lower electrode 1110. The interaction of the charged middle electrode 1106 and the electric field causes the middle electrode 1106 to move between electrodes 1102 and 1110. The middle electrode 1106 can be moved to various positions by varying the voltage applied by the control circuit 1120. For example, a positive voltage $V_c$ applied by control circuit 1120 causes the lower electrode 1110 to be driven to a positive potential with respect to the upper electrode 1102, which repels the positively charged middle electrode 1106. Accordingly, a positive voltage $V_c$ causes middle electrode 1106 to move toward upper electrode 1102. Application of a negative voltage $V_c$ by control circuit 1120 causes the lower electrode 1110 to be driven to a negative potential with respect to the upper electrode 1102, which attracts charged middle electrode 1106. Accordingly a negative voltage $V_c$ causes middle electrode 1106 to move toward lower electrode 1110. The middle electrode 1106 can accordingly move to a wide range of positions between electrodes 1102 and 1110.

A switch 1122 is used to selectively connect or disconnect the middle electrode 1106 from the charge pump 1118. It should be noted that other methods known in the art besides a switch may be used to selectively connect or disconnect the middle electrode 1106 from the charge pump 1118 such as a thin film semiconductor, a fuse, an anti fuse, etc.

The switch 1122 may be configured to open and close to deliver a specific charge to middle electrode 1106. A method of choosing a charge level is described below with respect to FIGS. 13 and 14. Further, switch 1122 may be configured to reapply a charge over time as the charge leaks away or dissipates from the middle electrode 1106. In one exemplary embodiment, charge is reapplied to middle electrode 1106 according to a specified time interval.

Figure 11:
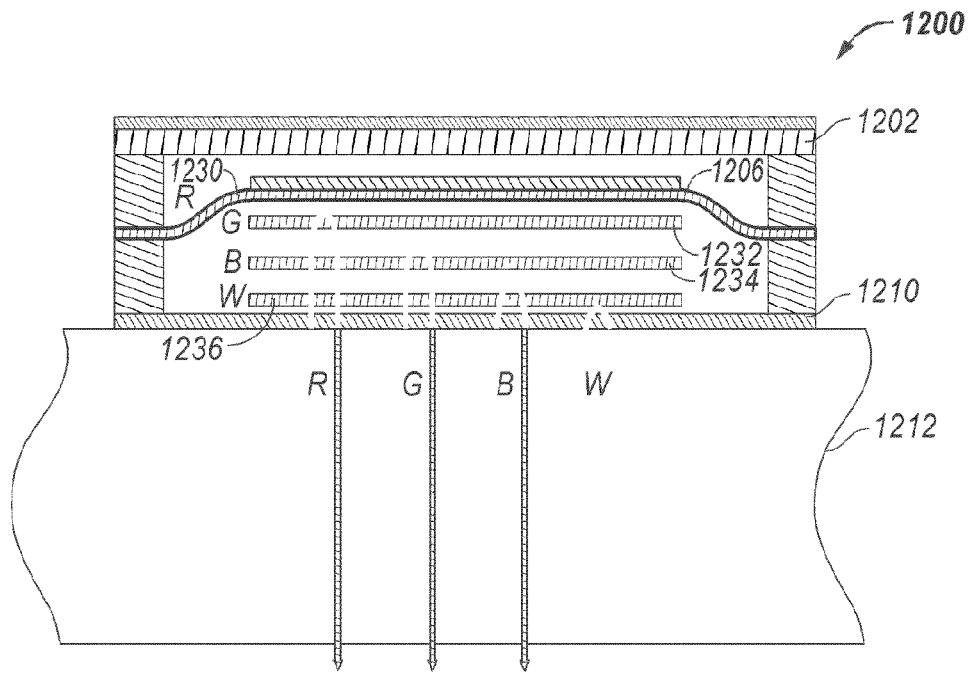
FIG. 11 a cross-section of is an interferometric modulator of the embodiment of FIG. 8 illustrating different actuation positions.

FIG. 11 is an exemplary embodiment of an analog interferometric modulator 1200 of the embodiment of FIG. 8. FIG. 11 illustrates a middle electrode 1206 capable of being moved to various positions 1230-1236 between upper electrode 1202 and lower electrode 1210. In one embodiment, the middle electrode is moved according to the structures and methods described with respect to FIG. 10.

The modulator 1200 is configured to selectively reflect certain wavelengths of light depending on the configuration of the modulator. The distance between the lower electrode 1210, which acts as an absorbing layer, and the middle electrode 1206 changes the interferometric properties of the modulator 1200. For example, the modulator 1200 is designed to be viewed on the substrate 1212 side of the modulator. Light enters the modulator 1200 through the substrate 1212. Depending on the position of the middle electrode 1206, different wavelengths of light are reflected back through the substrate 1212, which gives the appearance of different colors. For example, in position 1230, the red wavelength of light is reflected, while the other colors of light are absorbed. Accordingly, the interferometric modulator is in a red state. When the middle electrode moves to a position 1232, the modulator 1200 is in a green state and only the green wavelength of light is reflected. When the middle electrode moves to a position 1234, the modulator 1200 is in a blue state and only the blue wavelength of light is reflected. When the middle electrode moves to a position 1236, the modulator 1200 is in a white state and all the wavelengths of light in the visible spectrum are reflected. It should be noted that one of ordinary skill in the art will recognize that the modulator 1200 can take on different states and selectively reflect other wavelengths of light or combinations of wavelengths of light depending on the materials used in construction of the modulator and the position of the middle electrode 1206.

Figure 12:
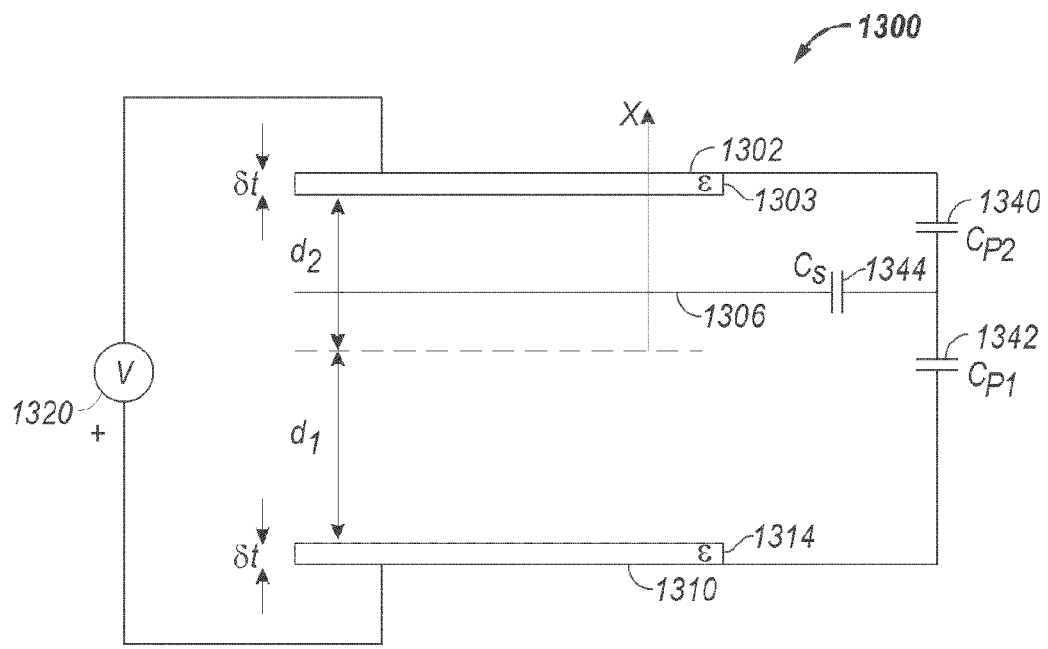
FIG. 12 is an illustration of an interferometric modulator of the embodiment of FIG. 8 designed to compensate for parasitic capacitance.

FIG. 12 is an exemplary embodiment of an analog interferometric modulator 1300 configured such that the middle electrode 1306 responds in linear proportion to a voltage driven across upper electrode 1302 and lower electrode 1310. Accordingly, there is a linear relationship between the voltage used to control the movement of the middle electrode 1306 and the position of the middle electrode 1306 between electrodes 1302 and 1310. In an ideal system, the electric field induced by the voltage driven can be defined as follows:

$$E = V/(\delta_1 + \delta_2) \qquad (1)$$

where:
  E is the electric field due to voltage V;
  V is the voltage applied by control circuit 1320;
  $\delta_1$ is the effective distance between the lower electrode 1310 and the middle electrode 1306; and
  $\delta_2$ is the effective distance between the upper electrode 1302 and the middle electrode 1306.

Effective distance takes into account both the actual distance (i.e., $d_1$ and $d_2$) between the two electrodes and the effect of the passivation layers 1314 and 1303. The passivation layer works to increase the effective distance and is calculated as $d_\in/\in$ where $d_\in$ is the thickness of the passivation layer and c is the dielectric constant of the passivation layer. Therefore, $\delta_1 = d_1 + d_\in/\in$ and $\delta_2 = d_2 + d_\in/\in$. It should be noted that passivation layers 1303 and 1314 may have different thicknesses and/or may be made of different materials.

The electric fields induced by the stored and isolated charge Q on middle electrode 1306 are given by:

$$E_2(x) = Q/(\in_0 * A) * (\delta_1 + x)/(\delta_1 + \delta_2) \qquad (2)$$

$$E_1(x) = -Q/(\in_0 * A) * (\delta_2 - x)/(\delta_1 + \delta_2) \qquad (3)$$

where:
  $E_2$ = the electric field induced between upper electrode 1302 and middle electrode 1306;
  $E_1$ = the electric field induced between lower electrode 1310 and middle electrode 1306;
  A = area of the electrodes;
  $\in_0$ = the dielectric permittivity of a vacuum; and
  x = the position of the middle electrode 1306 relative to the equilibrium position of the middle electrode 1306 where no voltage is applied by the control circuit 1320.

The force on the middle electrode due to the electric field is then given by:

$$F_E = Q^2/(2\in_0 A) * (\delta_1 - \delta_2 + 2x)/(\delta_1 + \delta_2) + QV/(\delta_1 + \delta_2) \qquad (4)$$

Additionally, as described with respect to FIG. 8, the side portions of the middle electrode 806 may apply an elastic spring force $F_S$ to the middle electrode. This mechanical restoration force is given by:

$$F_S = -Kx \qquad (5)$$

where:
  K = the spring constant.

The force balance ($F_E$ balancing $F_S$) is given by:

$$\frac{Q^2}{2\varepsilon_0 A}\left(\frac{\delta_1 - \delta_2 + 2x}{\delta_1 + \delta_2}\right) + \frac{QV}{\delta_1 + \delta_2} = Kx \qquad (6)$$

The position x of the middle electrode 1306 can then be solved utilizing equation (6) as:

$$x = \frac{\frac{Q^2}{2\varepsilon_0 A}\left(\frac{\delta_1 - \delta_2}{\delta_1 + \delta_2}\right) + \frac{QV}{\delta_1 + \delta_2}}{K - \frac{Q^2}{\varepsilon_0 A(\delta_1 + \delta_2)}} \qquad (7)$$

According to equation (7) the position of middle electrode 1306 in an ideal system is linearly dependent on the voltage V applied.

It should also be noted that the sign of the denominator of equation (7) indicates whether the structure is stable or not (i.e., whether the middle electrode 1306 will snap toward the closest outer electrode). Instability occurs if the electrostatic force on the middle electrode 1306 induced by the stored charge itself overcomes the mechanical restoration force. The point of instability is a threshold charge $Q_c$ given by the following equation:

$$Q_c = \sqrt{K \epsilon_0 A (\delta_1 + \delta_2)} \tag{8}$$

If the middle electrode 1306 is not completely isolated electrically, the stored charge Q on the middle electrode 1306 may vary as its position between electrodes 1302 and 1310. This variation in Q can affect the response of the middle electrode 1306 to a charge. When middle electrode 1306 is not completely isolated electrically, there are parasitic capacitances 1340, 1342 attached from it to each of the upper electrode 1302 and the lower electrode 1310. Modulator 1300 is configured to account for the parasitic capacitances 1340, 1342 by including a capacitor 1344 connected in series with middle electrode 1306 and in parallel with parasitic capacitances 1340, 1342. The effect of the capacitor 1344 in mitigating the parasitic capacitances 1340, 1342 so as to allow the middle electrode 1306 to move in linear relation to the voltage applied by control circuit 1320 is described below. The capacitor 1344 clamps the total capacitance loading the middle electrode 1306 and also blocks direct leakage paths for the charge on middle electrode 1306.

$C_2$ is the capacitance of the gap between upper electrode 1302 and middle electrode 1306 and $C_1$ is the capacitance of the gap between middle electrode 1306 and lower electrode 1310.

$$C_1 = \frac{\epsilon_0 A}{\delta_1 + x} \tag{9}$$

$$C_2 = \frac{\epsilon_0 A}{\delta_2 - x} \tag{10}$$

The intended stored charge value $Q_0$ from application of a voltage V is given by the following equation:

$$Q_0 = \left(\frac{C_S V}{C_1 + C_2 + C_S}\right)(C_1 + C_2) \tag{11}$$

where:

$C_S$=the value of capacitor 1344.

After the charge $Q_0$ is placed on the middle electrode 1306, the effect of the applied bias voltage V across electrodes 1302 and 1310 on the middle electrode 1306 can be calculated. The voltage dependent charge $Q_{MV}$ on middle electrode 1306 as a function of voltage and position of the middle electrode 1306 is given by the following equation:

$$Q_{MV} = \frac{C_S(C_{P1}C_2 - C_{P2}C_1)V}{(C_1 + C_2)(C_S + C_{P1} + C_{P2}) + C_S(C_{P1} + C_{P2})} \tag{12}$$

where:

$C_{P1}$=the value of parasitic capacitance 1342; and
$C_{P2}$=the value of the parasitic capacitance 1340.

In the case where $C_{P1} = C_{P2} = C_P \gg C_S$, the voltage dependent charge $Q_{MV}$ simplifies to:

$$Q_{MV} = \frac{C_S(C_2 - C_1)V}{2(C_1 + C_2 + C_S)} \tag{13}$$

The inequality holds where the value of $C_S$ is chosen so as to lower the overall capacitance loading the middle electrode 1306. If, however, there is an imbalance in the parasitic capacitances 1340, 1342 (i.e., $C_{P1} = C_P$, $C_{P2} = C_P + \delta C_P$) the induced charge on middle electrode 1306 is given by the equation:

$$Q_{MV} = \frac{C_S(C_2 - C_1 + \delta C_P C_2 / C_P)V}{2(C_1 + C_2 + C_S)} \tag{14}$$

Compensating values, however, can be applied to make the parasitic capacitances 1340 and 1342 approximately equal.

By combining the original stored charge $Q_0$ and the induced charge $Q_{MV}$ the actual charge on middle electrode $Q_M$ can be determined as $Q_M = Q_0 + Q_{MV}$. As long as capacitor 1344 is chosen such that equation (13) holds (i.e., $C_{P1} = C_{P2} = C_P \gg C_S$), $Q_M$ can be substituted for Q of equation (7) to give the position of the middle electrode 1306. Therefore, an appropriate capacitor 1344 will result in middle electrode 1306 responding in approximately linear response to a voltage applied by control circuit 1320. In one exemplary embodiment the capacitance of capacitor 1344 is approximately 1 fF. In another exemplary embodiment the capacitance of capacitor 1344 is approximately 10 fF.

The design of modulator 1300 also limits the value of the associated electric field as the gap between the middle electrode 1306 and the lower electrode 1310 approaches 0. The limiting expression for the electric field $E_{lower}$ of an interferometric modulator utilizing 3 electrodes is given by the following equation:

$$E_{lower} = V/(\delta_1 + \delta_2) - Q/(\epsilon_0 A) \tag{15}$$

which is the sum of the electric field due to the charge stored on middle electrode 1306 and the electric field applied by control circuit 1320.

Figure 13:
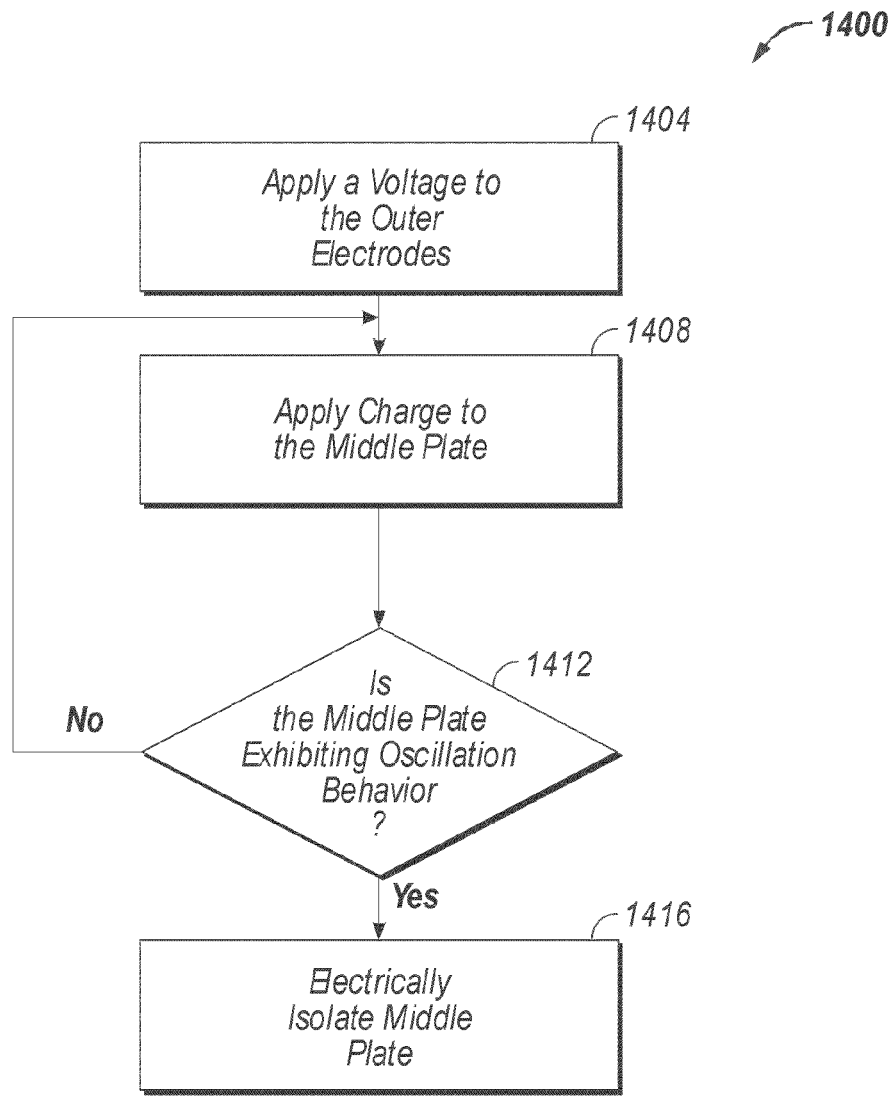
FIG. 13 is a flowchart of an embodiment of a process of calibrating the interferometric modulator of the embodiment of FIG. 9.

FIG. 13 illustrates the process 1400 by which the analog interferometric modulator 1300 of FIG. 12 is calibrated. The calibration process configures the modulator 1300 so that the middle electrode 1306 will move to a known position between upper electrode 1302 and lower electrode 1310 when a particular voltage is applied. Process 1400 is described below with reference to FIG. 14 which illustrates an interferometric modulator 1300 in various states of the calibration process 1400.

When manufactured, the structure of any two given analog interferometric modulators may have variations. There may be slight variations in some of the physical properties of two similar analog interferometric modulators. For example, the spring constant K, the exact dimensions of layers, and the spacing of layers may all differ. Variation can occur due to process variations, temperature, and aging. In this case, to accurately calculate the position x of middle electrode 1306 using equation (7) would require knowledge of all of these variables. Further, if any variable differs between any given analog interferometric modulators, the position x of middle electrode 1306 for each modulator may differ when a known voltage is applied and a known charge is stored on middle electrode 1306. FIGS. 13 and 14 illustrate a process of calibrating an analog interferometric modulator such as one of the embodiment of FIG. 12 such that the approximate position of the middle electrode 1306 at any given voltage applied by control circuit 1320 is known without exact knowledge of the previously discussed variables.

At a step 1404, switch 1522 is closed to ground and a calibration potential $V_{cal}$ is applied by control circuit 1520 as shown in FIG. 14a. At a next step 1408, a net negative charge is induced on the middle electrode 1506. In one exemplary embodiment, a charge pump 1118 as shown with respect to FIG. 10 induces the negative charge on the middle electrode 1506 while switch 1522 is closed. As the charge is deposited on the middle electrode 1506, the charged electrode 1506 interacts with the electric field created by the applied calibration potential and moves toward the upper electrode 1502 as shown in FIG. 14b. The force from the electrostatic attraction is proportional to the square of the applied electric field which increases as the distance between upper electrode 1502 and middle electrode 1506 decreases, and as the charge on the middle electrode 1506 increases. At a certain charge and distance, the force of the electric field overwhelms the elastic spring force $F_S$ on the middle electrode 1506. At this point, the middle electrode 1506 "snaps" toward the upper electrode 1502. The middle electrode 1506 then contacts resistive elements or posts 1516 as shown in FIG. 14c. When contact is made, the potential difference between the upper electrode 1502 and the middle electrode 1506 drops to the resistive divide between the source resistance 1548 and the resistance of the posts 1516. The potential drops exponentially. As the potential drops, the mechanical restoring force or elastic spring force becomes greater than the electrostatic force on the middle electrode 1506. The middle electrode 1506 then moves away from the resistive posts and the potential difference between the upper electrode 1502 and the middle electrode 1506 begins to climb back to the potential applied by the control circuit 1120 between upper electrode 1502 and lower electrode 1510. This results in an oscillation behavior. At a further step 1412 it is determined if the middle electrode 1506 is exhibiting oscillation behavior. If it is determined the middle electrode 1506 is not exhibiting oscillation behavior, the process 1400 returns to step 1408 and the charge continues to be induced on middle electrode 1506. When, at step 1412, it is determined that the middle electrode 1506 is exhibiting oscillation behavior, the process 1400 continues to a step 1416. The oscillation behavior can be sensed using known methods in the art. At step 1416 the switch 1522 is opened to electrically isolate middle electrode 1506 and maintain an equilibrium charge $Q_e$ on the middle electrode 1506. When the switch 1522 is opened, the middle electrode 1506 will remain at a small distance $d_g$ from the resistive posts 1516. In an exemplary embodiment the distance $d_g$ is much smaller than the distance $d_2$ between upper electrode 1502 and middle electrode 1506. Accordingly, when the middle electrode 1506 holds a charge $Q_e$ and $V_{cal}$ is applied by control circuit 1120, $x \approx d_2$ and the middle electrode 1506 will move a distance of approximately $d_2$ toward upper electrode 1502. When no potential is applied by control circuit 1120, $x=0$ and the middle electrode will remain in an unmoved position between upper electrode 1502 and bottom electrode 1510. As indicated by equation (7) above, the movement of middle electrode 1506 is linear in relation to the applied voltage, and therefore as one of reasonable skill in the art will recognize, an equation for the position x of the middle electrode 1506 can be determined using the two sets of values for the position of middle electrode x in relation to an applied voltage (e.g., (0,0) and ($d_2$, $V_{cal}$).

In addition to sensing the oscillation, other variations for determining when to disconnect switch 1522 at step 1412 to obtain an equilibrium charge $Q_e$ exist. In one embodiment of the calibration process, switch 1522 is opened when the middle electrode 1506 makes contact with the resistive posts 1516. As the charge bleeds off the middle plate will separate from the resistive posts 1516 and hold an equilibrium charge. In another embodiment, switch 1522 is opened when the middle electrode 1506 acquires a sufficient charge to snap to resistive posts 1516, but before middle electrode 1506 makes contact with the resistive posts 1516. The duration necessary to acquire sufficient charge may be calculated or established during a previous execution of the calibration process.

It should be noted that charge on the middle electrode 1506 may eventually bleed off and need to be re-charged periodically. The process 1400 can be repeated in order to re-charge the middle electrode 1506. In one embodiment, the re-charging process may also be modified such that the switch 1522 is only closed long enough to induce a charge greater than $Q_e$ on the middle electrode 1506. The excess charge will then bleed through the resistive posts 1516 to the appropriate $Q_e$. In one embodiment, the re-charging process may be scheduled for set intervals, such as after a set time interval. In another embodiment, the charge may be monitored and the modulator recharged when the charge on the middle electrode 1506 goes below a threshold value.

It should also be noted that in one embodiment, interferometric modulator 1500 includes an additionally layer at the bottom of the middle electrode 1506 which may prevent discharge of the middle electrode 1506 if it contacts lower electrode 1510. In one embodiment, the additional layer is a thin insulator.

While the above process 1400 is described in the detailed description as including certain steps and are described in a particular order, it should be recognized that these processes may include additional steps or may omit some of the steps described. Further, each of the steps of the processes does not necessarily need to be performed in the order it is described.

While the above detailed description has shown, described and pointed out novel features of the invention as applied to various embodiments, it will be understood that various omissions, substitutions, and changes in the form and details of the modulator or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A device for modulating light, comprising:
a first layer;
a second layer, wherein a gap is present between the first and second layers, and the first layer and second layer are stationary relative to each other;
a third layer disposed in the gap between the first and second layers;
a switch for electrically isolating the third layer; and
a control circuit configured to selectively induce an electric field between the first and second layers by applying a bias voltage across the first layer and the second layer;
wherein the control circuit is configured to cause the third layer to move within the gap by varying the bias voltage, wherein movement of the third layer is based on an electrostatic force between the electric field and a charge applied to the third layer and a mechanical restorative force acting on the third layer.

2. The device of claim 1, wherein at least one resistive element is disposed on the bottom of the first layer.

3. The device of claim 2, wherein the control circuit is configured to apply a first voltage as the bias voltage when the device is in calibration mode, wherein the third layer contacts the resistive element of the first layer subsequent to the first voltage being applied.

4. The device of claim 1, wherein the third layer comprises an optical mirror.

5. The device of claim 1, wherein the second layer comprises a thin optical absorber.

6. The device of claim 1, wherein the control circuit is configured to apply a first voltage as the bias voltage when the device is in a calibration mode.

7. The device of claim 6, wherein subsequent to the first voltage being applied, the electrostatic force is approximately equal to the mechanical restorative force.

8. The device of claim 1, wherein the third layer is configured to move in linear proportion to the bias voltage.

9. A method of calibrating an analog interferometric modulator, comprising:
providing a first electrode and a second electrode, wherein a gap is present between the first electrode and the second electrode;
applying a bias voltage across the first electrode and the second electrode to induce an electric field between the first electrode and the second electrode; and
moving a third electrode within the gap by varying the bias voltage, wherein movement of the third electrode is based on an electrostatic force between the electric field and a charge applied to the third electrode and a mechanical restorative force acting on the third electrode, and wherein a switch may electrically isolate the third electrode.

10. The method of claim 9, further comprising determining an amount of fixed charge comprising:
providing at least one resistive element disposed on the first electrode;
applying a calibration voltage as the bias voltage to the first electrode and second electrode; and
adjusting the charge on the third electrode such that the electric field induced by the calibration voltage causes the third electrode to contact the at least one resistive element of the first electrode.

11. The method of claim 9, further comprising adjusting the charge on the third electrode such that the electrostatic force about equals the mechanical restorative force.

12. The method of claim 9, wherein the inducing comprises inducing the charge on the third electrode such that the displacement of the third electrode responds in linear proportion to the bias voltage.

13. A device for modulating light, comprising:
first means for conducting current;
second means for conducting current, wherein a gap is present between the first conducting means and the second conducting means;
means for applying a bias voltage across the first conducting means and the second conducting means to induce an electric field between the first conducting means and the second conducting means;
third means for conducting current; and
means for electrically isolating the third conducting means,
wherein the means for applying a bias voltage is configured to cause the third means for conducting current to move within the gap by varying the bias voltage, wherein movement of the third means for conducting current is based on an electrostatic force between the electric field and a charge applied to the third means for conducting current and a mechanical restorative force acting on the third means for conducting current.

14. The device of claim 13, wherein the applying means comprises a control circuit.

15. The device of claim 13, wherein the means for electrically isolating comprises a switch.

16. The device of claim 13, wherein the means for electrically isolating comprises a thin film semiconductor.

17. The device of claim 13, wherein an insulating layer is disposed on the top of the second conducting means.

18. The device of claim 13, wherein a stiffening layer is disposed on the third conducting means.

19. The device of claim 13, wherein a capacitor is in communication with the third conducting means.

20. The device of claim 13, wherein the first conducting means comprises an electrode, the second conducting means comprises an electrode, and the third conducting means comprises an electrode.

21. The device of claim 13, wherein means for inducing is further configured to induce the charge on the third means for conducting current such that movement of the third conducting means is in linear proportion to the bias voltage.

* * * * *